Sept. 22, 1970    M. L. DAUGHERTY    3,529,737
MOTORCYCLE CARRIER FOR VEHICLES
Filed June 27, 1967    2 Sheets-Sheet 1

Melwyn L. Daugherty
INVENTOR.

Sept. 22, 1970     M. L. DAUGHERTY     3,529,737
MOTORCYCLE CARRIER FOR VEHICLES
Filed June 27, 1967     2 Sheets-Sheet 2

Melwyn L. Daugherty
INVENTOR.

BY Clarence A. O'Brien
and Harvey B. Jacobson
Attorneys

United States Patent Office 3,529,737
Patented Sept. 22, 1970

3,529,737
MOTORCYCLE CARRIER FOR VEHICLES
Melwyn Daugherty, 374-A Academy,
Bishop, Calif. 93514
Filed June 27, 1967, Ser. No. 649,278
Int. Cl. B60r 9/00
U.S. Cl. 214—450   4 Claims

ABSTRACT OF THE DISCLOSURE

An elongated ramp structure having one end portion pivotally supported from one end portion of a transversely extending vehicle bumper assembly for swinging movement about an upstanding axis as well as a horizontal axis extending transversely of the ramp and the other end portion of the ramp being adapted for removable support from the other end of the transversely extending bumper assembly, whereby the free swinging end of the ramp may be removed from supporting engagement with the bumper assembly, swung laterally away from the bumper assembly and then downward toward engagement with the ground and a two wheeled vehicle such as a motorcycle may be rolled from the ground upwardly along the ramp before the ramp is returned to a position fully supported from the bumper assembly with the free swinging end of the ramp elevated, and swung toward and removably secured to the corresponding end of the associated bumper assembly.

The motorcycle carrier has been specifically designed to provide a means whereby a motorcycle may be carried at either end portion of a vehicle and may be readily loaded onto or unloaded from the vehicle.

Although the motorcycle carrier is illustrated and described hereinafter as being specifically designed for use in conjunction with motorcycles, it is to be understood that the carrier may also be utilized for motor scooters, bicycles and other wheeled objects as well as non-wheeled objects. When used in conjunction with non-wheeled objects the ramp portion of the carrier may be provided with a load supporting member mounted thereon for anti-friction movement therealong. Further, although the carrier is also illustrated and described hereinafter as being supported from a transversely extending bumper assembly of a motor vehicle, it is to be noted that the carrier could readily be supported from side portions of any vehicle and also end portions of motor vehicles not provided with bumper assemblies.

The main object of this invention is to provide a motorcycle carrier which may be utilized to transport motorcycles, motor scooters or bicycles and the like from the rear end of a motor vehicle.

A further object of this invention, in accordance with the preceding object, is to provide a motorcycle carrier constructed in a manner enabling a motorcycle or the like to be readily loaded on an associated vehicle or unloaded from an associated vehicle.

A further object of this invention is to provide a motorcycle carrier including means by which a motorcycle supported therefrom may be conveniently braced in upright position on the motorcycle carrier.

Yet another object of this invention is to provide a motorcycle carrier including a motorcycle supporting, loading and unloading ramp which is supported at one end from the associated vehicle for swinging movement both about an upstanding axis and a horizontal axis extending transversely of the ramp.

A final object of this invention to be specifically enumerated herein is to provide a motorcycle carrier which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
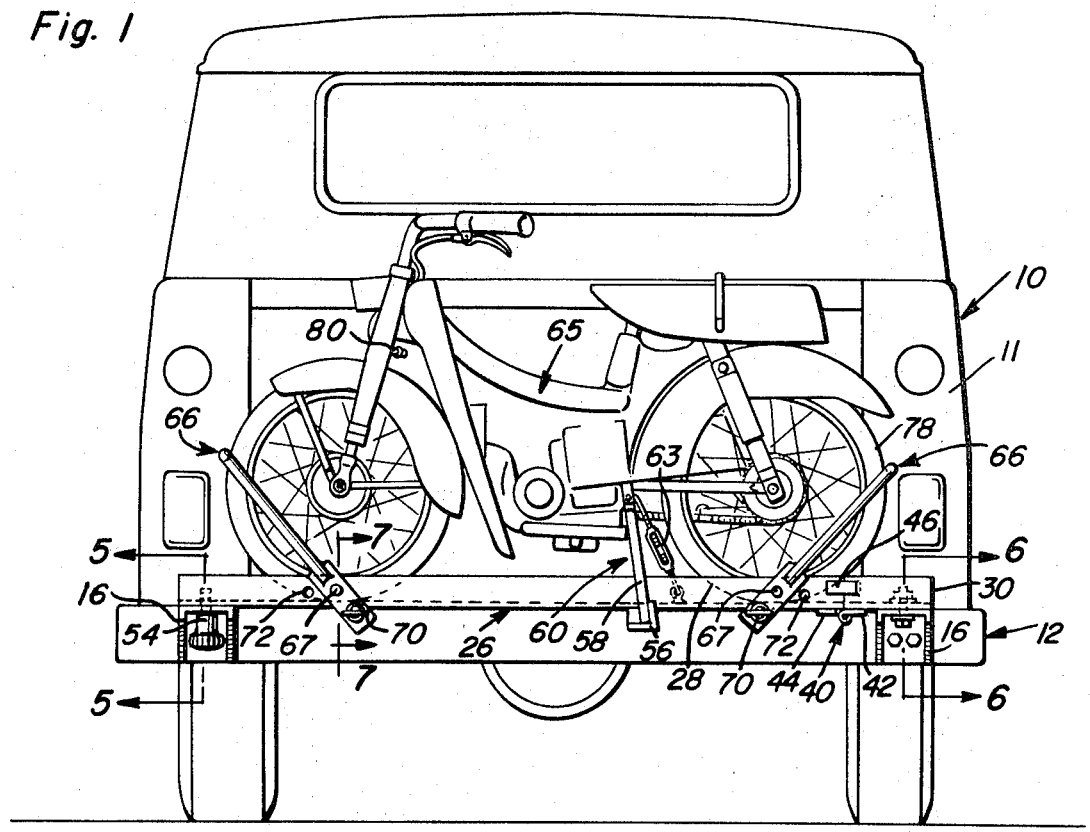
FIG. 1 is a rear elevational view of a pickup truck type vehicle with the motorcycle carrier supported from the rear bumper assembly of the vehicle and with a motorcycle supported on the carrier.

Referring now more specifically ot the drawings, the numeral 10 generally designates a pickup truck provided with an elongated body 11 including a rear transversely extending bumper assembly referred to in general by the reference numeral 12 secured thereto. The carrier is generally designated by the reference numeral 14 and includes a pair of similar mounting brackets 16 secured to opposite ends of the rear bumper assembly 12 in any convenient manner such as by fasteners 18. The mounting brackets 16 project rearwardly of the bumper assembly 12 and include depending generally triangular opposite side flanges 20 interconnected at their upper ends by means of a bight portion 22 and at their forward ends by means of a front wall or flange 24 which abuts up against the rear face of the bumper assembly 12 and through which the corresponding fastener 18 is secured.

The carrier 14 includes an elongated ramp structure referred to in general by reference numeral 26 consisting of a ramp member 28 and a short extension 30. The ramp member and extension are each generally channel-shaped in cross-section and the ramp member 28 includes a pair of upstanding opposite side flanges 32 interconnected at their lower edge portions by means of a bight portion 34 while the extension 30 includes a pair of upstanding opposite side flanges 36 interconnected at their lower marginal portions by means of a bight portion 38. The ramp member 28 and extension 30 are disposed in end abutting relation and a hinge structure generally referred to by the reference numeral 40 is provided to pivotally connect the extension 30 and the adjacent end of the ramp member 28. The hinge assembly 40 includes a hinge leaf 42 secured to the undersurface of the bight portion 38 and a hinge leaf 44 secured to the undersurface of the bight portion 34. Further, the ends of the flanges 36 adjacent the ramp member 28 include longitudinally extending tongues 46 between which the adjacent ends of the flanges 32 are embracingly received when the ramp member and extension are aligned.

Figure 4:
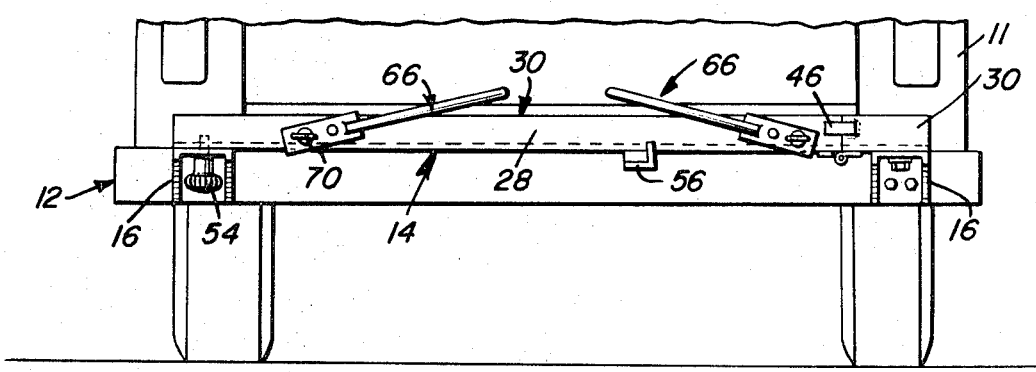
FIG. 4 is a view similar to FIG. 1 but with the motorcycle removed and the wheel engaging braces of the carrier in collapsed positions.
Figure 5:
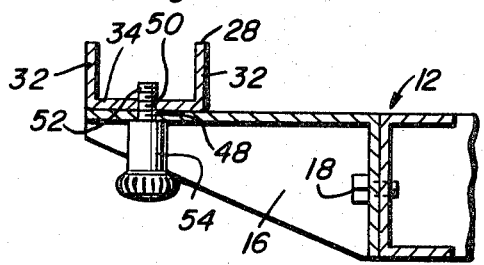
FIG. 5 is an enlarged fragmentary vertical sectional view taken substantially upon the plane indicated by section line 5—5 of FIG. 1.
Figure 6:
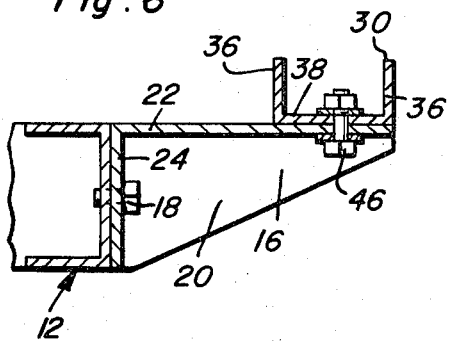
FIG. 6 is an enlarged fragmentary vertical sectional view taken substantially upon the plane indicated by section line 6—6 of FIG. 1.
Figure 7:
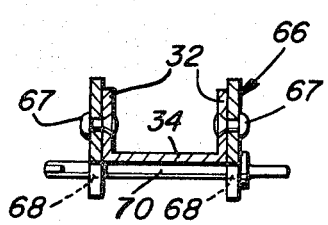
FIG. 7 is a fragmentary vertical sectional view taken substantially upon the plane indicated by the section line 7—7 of FIG. 1.

The end of the bight portion 38 remote from the bight portion 34 is pivotally secured to the rear end portion of the adjacent bight portions 22 by means of a pivot fastener 46 and the rear end of the other bight portion 22 includes an aperture 48 with which a threaded aperture 50 formed in the end of the bight portion 34 remote from the extension 30 is registrable, the threaded shank portion 52 of a fastener including an enlarged handgrip portion 54 being insertable through the aperture 48 and threadedly engageable in the threaded aperture 50 so as to releasably retain the ramp member 28 in the position thereof illustrated in FIGS. 1 and 4 of the drawings.

The ramp member 28 has a generally L-shaped and transversely extending member 56 secured to its undersurface intermediate its opposite ends upon which the depending leg portions of a kick stand assembly generally referred to by the reference numeral 60 carried by a motorcycle referred to in general by the reference numeral 65 and supported upon the ramp member 28 are adapted to rest. Further an eye member 62 is secured through the bight portion 34 and has one end of a turnbuckle 63 engaged therewith, the other end portion 64 of the turnbuckle 63 being releasably engageable with any suitable portion of the frame of the motorcycle 65.

Figure 2:
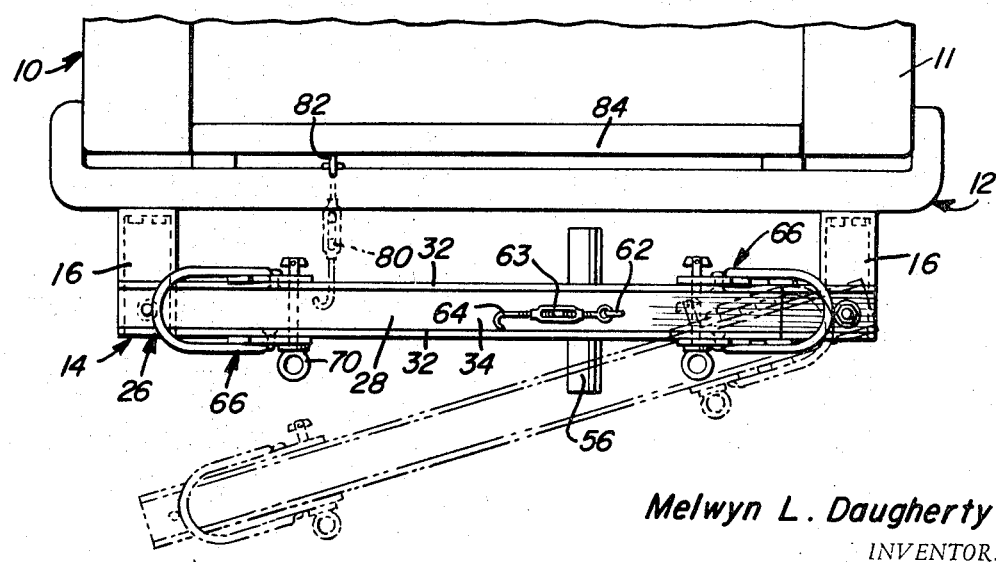
FIG. 2 is a fragmentary top plan view of the rear of the vehicle illustrated in FIG. 1 with the motorcycle removed from engagement therewith and an alternate position of the ramp portion of the carrier illustrated in phantom lines.
Figure 3:
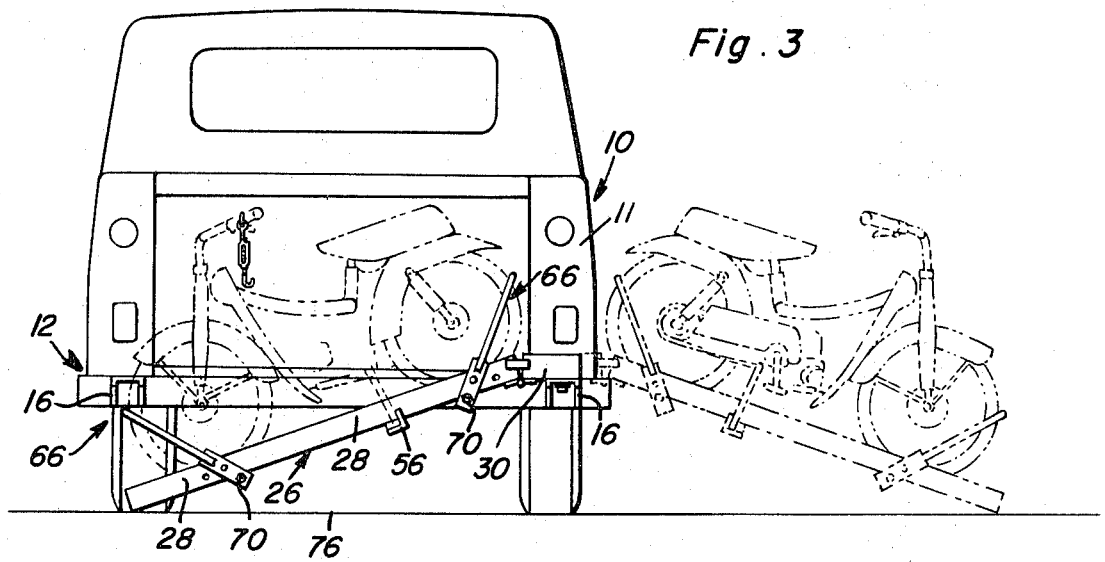
FIG. 3 is a rear elevational view of the vehicle illustrated in FIG. 1 on somewhat of a reduced scale and illustrating two alternate positions of the ramp portion of the carrier, one alternate position being illustrated in solid lines and the second alternate position being illustrated in phantom lines.

A pair of generally U-shaped support arms referred to in general by the reference numeral 66 are provided and have the free end of their leg portions pivotally secured to the flanges 32 by means of suitable pivot fasteners 67. In addition, the free ends of the leg portions of the arms 66 have aligned apertures 68 formed therethrough. A pair of movable locking pins 70 are provided and are insertable through pairs of aligned apertures 68 for engagement with the adjacent undersurface portions of the bight portion 34 to retain the arm 66 in the operative positions thereof illustrated in FIGS. 1–3 of the drawings. Further, the flanges 32 also include registered apertures 72 with which the apertures 68 are registrable when the arms 66 are in the inoperative positions illustrated in FIG. 4 of the drawings and through which the pins 70 may be passed to retain the arms 66 in the operative positions.

In operation, and assuming the carrier 14 to have its ramp structure 26 positioned as illustrated in FIG. 4 of the drawings, the pin 70 retaining the right-hand arm 66 in the inoperative position may be removed so that the right-hand arm 66 may be pivoted to the operative and locked therein. Then, the other arm 66 may be unlocked and swung generally 180° from the position thereof illustrated in FIG. 4 of the drawings after which the threaded shank portion 52 may be removed and the left end of the ramp member 28 may be swung rearwardly away from the bumper assembly 12 and downwardly into engagement with the ground 76. Thereafter, the motorcycle 65 may be rolled upwardly along the ramp member 28 until the rear wheel 78 of the motorcycle 65 is fully cradled in the right-hand arm 66. This will at least partially support the motorcycle 65 in an upright position while the person loading the motorcycle 65 on the carrier 14 swings the left-hand arm 66 to the operative position illustrated in FIG. 3 and locks the arm 66 in operative position. Thereafter, the end of the ramp member 28 remote from the extension 30 may be swung upwardly to a horizontal position and then toward the bumper assembly 12 for registry of the aperture 50 with the aperture 50 with the aperture 48 prior to reinsertion of the threaded shank portion 52 through the aperture 48 and into threaded engagement with the threaded aperture 50. Of course, the kick stand 60 may be swung down to its operative position illustrated in FIG. 1 of the drawings after the motorcycle 65 has been rolled onto the ramp member 28 and the turnbuckle 63 may be suitably engaged with the frame of the motorcycle 65 to complete the securement of the latter to the carrier 14.

Of course, if the motorcycle 65 is to be unloaded from the carrier 14, the above procedure is substantially reversed. Further, if desired, instead of swinging the free end of the ramp member 28 only slightly rearward of the bumper assembly 12 before the free end of the ramp member 28 is lowered, the ramp member 28 may be swung as much as 180° to the position thereof illustrated by phantom lines in the right-hand portion of FIG. 3.

Also, a second turnbuckle 80 is provided and may be supported from an eye 82 mounted on the rear face of the tail gate 84 of the truck 10. This second turnbuckle 80 may also be engaged with any suitable portion of the frame of the motorcycle 65 to further support the latter when the vehicle 10 is in transit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a wheeled vehicle, a generally horizontal elongated ramp, mounting means pivotally supported from a first portion of said vehicle for rotation about an upstanding axis between first and second positions, one end portion of said ramp being pivotally supported from said mounting means for rotation about a horizontal axis extending transversely of said ramp, the other end portion of said ramp, when said mounting means is in said first position, being adapted to swing downwardly to engage the ground upon which said vehicle rests and, when said mounting means is in said second position, including a portion thereof releasably supportable from a second portion of said vehicle with said other end portion of said ramp elevated and with said ramp generally horizontally disposed, said vehicle including a transversely extending bumper assembly, said first portion of said vehicle comprising one end of said bumper assembly and said second portion of said body comprising the other end of said bumper assembly, said mounting means, with said ramp attached thereto, being swingable relative to said vehicle at least 180 degrees.

2. The combination of claim 1 wherein said ramp includes inverted generally U-shaped arms releasably securable in upwardly divergent position for embracingly receiving the remote lower portions of the wheels of a two wheeled vehicle disposed on said ramp.

3. The combination of claim 1 wherein said ramp includes oppositely directed outwardly projecting and upwardly facing abutment surface means intermediate the opposite ends of said ramp adapted to have the lower ends of opposite side depending leg portions of the stand of a motorcycle disposed on said ramp rest thereagainst.

4. The combination of claim 1 wherein said mounting means includes a portion thereof, to which said ramp is pivotally secured for rotation about said horizontal axis, defining a short horizontal extension of the corresponding end of said ramp.

References Cited

UNITED STATES PATENTS

| | | |
|---|---|---|
| 2,552,977 | 5/1951 | Klotz. |
| 2,994,159 | 8/1961 | Bonidie. |
| 3,074,569 | 1/1963 | Ajero. |
| 3,207,396 | 9/1968 | Mundell et al. |
| 3,348,713 | 10/1967 | Will _____ 214—450 |
| 3,251,520 | 5/1966 | Van Dyke et al. |

GERALD M. FORLENZA, Primary Examiner

R. B. JOHNSON, Assistant Examiner

U.S. Cl. X.R.

224—42.08